United States Patent
Kaizu et al.

(10) Patent No.: US 9,705,384 B2
(45) Date of Patent: Jul. 11, 2017

(54) ROTOR FOR ROTATING ELECTRIC MACHINE

(71) Applicant: DENSO CORPORATION, Kariya, Aichi-pref. (JP)

(72) Inventors: Hiroo Kaizu, Nishio (JP); Seiji Kondoh, Kariya (JP); Shigenobu Nakamura, Anjo (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 14/296,829

(22) Filed: Jun. 5, 2014

(65) Prior Publication Data

US 2014/0368067 A1 Dec. 18, 2014

(30) Foreign Application Priority Data

Jun. 17, 2013 (JP) .................................. 2013-126532

(51) Int. Cl.
*H02K 9/06* (2006.01)
(52) U.S. Cl.
CPC ...................................... *H02K 9/06* (2013.01)
(58) Field of Classification Search
CPC ......................................................... H02K 9/06
USPC ....................................................... 310/62, 63
See application file for complete search history.

(56) References Cited

U.S. PATENT DOCUMENTS

| 4,682,002 A | 7/1987 | Delle Piane et al. |
| 5,977,668 A | 11/1999 | Yoshioka |
| 6,078,116 A | 6/2000 | Shiga et al. |
| 6,455,958 B1 * | 9/2002 | Asao ...................... H02K 1/243 310/263 |
| 2004/0108775 A1 * | 6/2004 | Bilsing .................... H02K 9/06 310/58 |
| 2004/0178697 A1 * | 9/2004 | York ........................ H02K 9/06 310/263 |
| 2006/0163221 A1 * | 7/2006 | Makase .................. B23K 26/08 219/121.64 |
| 2007/0041843 A1 * | 2/2007 | Vasilescu .............. F04D 29/281 416/244 R |
| 2007/0273243 A1 * | 11/2007 | Okumoto ................. H02K 9/06 310/263 |
| 2009/0184593 A1 * | 7/2009 | Kaizu .................... H02K 1/243 310/62 |

FOREIGN PATENT DOCUMENTS

| FR | 2586145 A1 * | 2/1987 | .............. H02K 9/06 |
| JP | A-2000-092787 | 3/2000 | |
| JP | 2007-000909 A | 1/2007 | |
| JP | 2008000764 A * | 1/2008 | |
| JP | 2009183970 A * | 8/2009 | |

OTHER PUBLICATIONS

Sakamoto, Machine Translation of JP2008000764, Jan. 2008.*
Morikawa, Machine Translation of JP2009183970, Aug. 2009.*
Meuret, Machine Translation of FR2586145, Feb. 1987.*

* cited by examiner

*Primary Examiner* — Quyen Leung
*Assistant Examiner* — Eric Johnson
(74) *Attorney, Agent, or Firm* — Oliff PLC

(57) ABSTRACT

A rotor is provided for a rotating electric machine. The rotor includes a magnetic pole core and a cooling fan. The cooling fan includes a base plate laser-welded to an axial end face of the magnetic pole core and a plurality of fan blades extending from the base plate. Further, in the rotor, a weld formed between the base plate of the cooling fan and the magnetic pole core has a pair of open ends.

6 Claims, 6 Drawing Sheets

ROTOR FOR ROTATING ELECTRIC MACHINE

CROSS-REFERENCE TO RELATED APPLICATION

This application is based on and claims priority from Japanese Patent Application No. 2013-126532, filed on Jun. 17, 2013, the content of which is hereby incorporated by reference in its entirety into this application.

BACKGROUND

1. Technical Field

The present invention relates to rotors for rotating electric machines that are used in, for example, passenger cars and trucks as electric motors and electric generators.

2. Description of Related Art

Conventionally, there is known a method of fixing a cooling fan to an axial end face of a magnetic pole core of a rotor by projection welding with a spherical projection formed on one surface of the cooling fan (see, for example, Japanese Unexamined Patent Application Publication No. 2000-92787). With this method, the parts count of the rotor can be reduced. Moreover, since it is unnecessary to perform a bolt-fastening process for fixing the cooling fan to the magnetic pole core, the productivity of the rotor can be improved.

On the other hand, the electrical load capacities of motor vehicles vary depending on the design specifications of the vehicles. Therefore, considering the use of automotive alternators in various motor vehicles, it is necessary to increase variation in the outputs of the alternators. Generally, the outputs of the alternators are proportional to $D^2L$, where D and L are respectively the inner diameter and axial length of a stator core of the alternator. Moreover, varying D is preferable to varying L in terms of increasing variation in the outputs of the alternators while minimizing dimensional change in the alternators.

However, when D is increased for increasing the output of an automotive alternator, the outer diameter of a rotor of the alternator is accordingly increased; the rotor is rotatably disposed radially inside the stator core with a predetermined gap formed between the radially outer periphery of the rotor and the radially inner periphery of the stator core. In this case, to increase the strength of the cooling fan against the centrifugal force, it is necessary to shift the welding position radially outward. Consequently, it becomes necessary to replace the welding electrodes according to the change in the welding position, thereby complicating the manufacturing process and increasing the manufacturing cost.

In addition, it may be possible to eliminate the need of replacing the welding electrodes by employing a special welding apparatus. However, in this case, it would be still difficult to reduce the manufacturing cost due to the maintenance necessary for the special welding apparatus.

The above problem can be solved by applying laser welding instead of projection welding. More specifically, laser welding does not require welding electrodes. Therefore, in the case of applying laser welding instead of projection welding, it is unnecessary to replace welding electrodes according to change in the welding position. Consequently, it is possible to simplify the manufacturing process and reduce the manufacturing cost.

On the other hand, in operation of the alternator, the cooling fan is subjected to water which flows to the cooling fan along with the cooling air. Therefore, to prevent the cooling fan from being rusted by the water, the cooling fan is generally made of a steel plate which is plated with, for example, zinc. However, in this case, during the laser welding of the cooling fan to the magnetic pole core, metal gas will be produced by the melting of the plating metal (e.g., zinc). Consequently, due to the metal gas, it becomes easy for voids to be formed in the molten portions of the cooling fan and the magnetic pole core, thereby lowering the welding strength and thus the reliability of the rotor.

SUMMARY

According to an exemplary embodiment, there is provided a rotor for a rotating electric machine. The rotor includes a magnetic pole core and a cooling fan. The cooling fan includes a base plate, which is laser-welded to an axial end face of the magnetic pole core, and a plurality of fan blades extending from the base plate. Further, in the rotor, a weld formed between the base plate of the cooling fan and the magnetic pole core has a pair of open ends.

With the above configuration, the cooling fan is fixed to the magnetic pole core by laser welding. Therefore, when the welding position is changed with a dimensional change in the rotating electric machine, it is unnecessary to replace welding jigs according to the change in the welding position. As a result, it is possible to simplify the manufacturing process and reduce the manufacturing cost.

Moreover, with the above configuration, the weld does not have a closed loop shape. Consequently, when the cooling fan is made of a steel sheet that is plated with, for example, zinc and thus zinc gas is produced by the melting of zinc during the laser welding, the zinc gas can be easily exhausted via the gap between the base plate of the cooling fan and the axial end face of the magnetic pole core, thereby making it difficult for voids to be formed in the molten portions of the base plate and the magnetic pole core. As a result, the welding strength and thus the reliability of the rotor can be improved.

In further implementations, the weld may have the shape of an open loop elongated in a given direction.

The weld may include at least one curved part; an end of the curved part makes up one of the open ends of the weld. Moreover, in this case, it is preferable that an area between the open end of the weld made up of the end of the curved part and any other part of the weld falls outside of the weld.

Furthermore, the weld may include a straight part and a pair of curved parts respectively extending from opposite ends of the straight part. Moreover, the rotor may further include a rotating shaft on which the magnetic pole core is fixed. In this case, it is preferable that the straight part of the weld extends straight substantially along a radial direction of the rotating shaft.

The weld may be substantially C-shaped.

On at least one of the axial end face of the magnetic pole core and an axial end face of the base plate of the cooling fan which faces the axial end face of the magnetic pole core, there may be formed a protrusion so as to have an axial gap formed around the protrusion and between the axial end faces of the base plate of the cooling fan and the magnetic pole core. Moreover, the rotor may further include a rotating shaft on which the magnetic pole core is fixed. In this case, the protrusion is preferably positioned so that at least part of the protrusion does not overlap the weld in an axial direction of the rotating shaft.

Alternatively, in at least one of the axial end faces of the base plate of the cooling fan and the magnetic pole core, there may be formed a recess. In this case, it is preferable that the recess extends to have an end thereof coinciding with a radially outer end of the based plate of the cooling fan.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
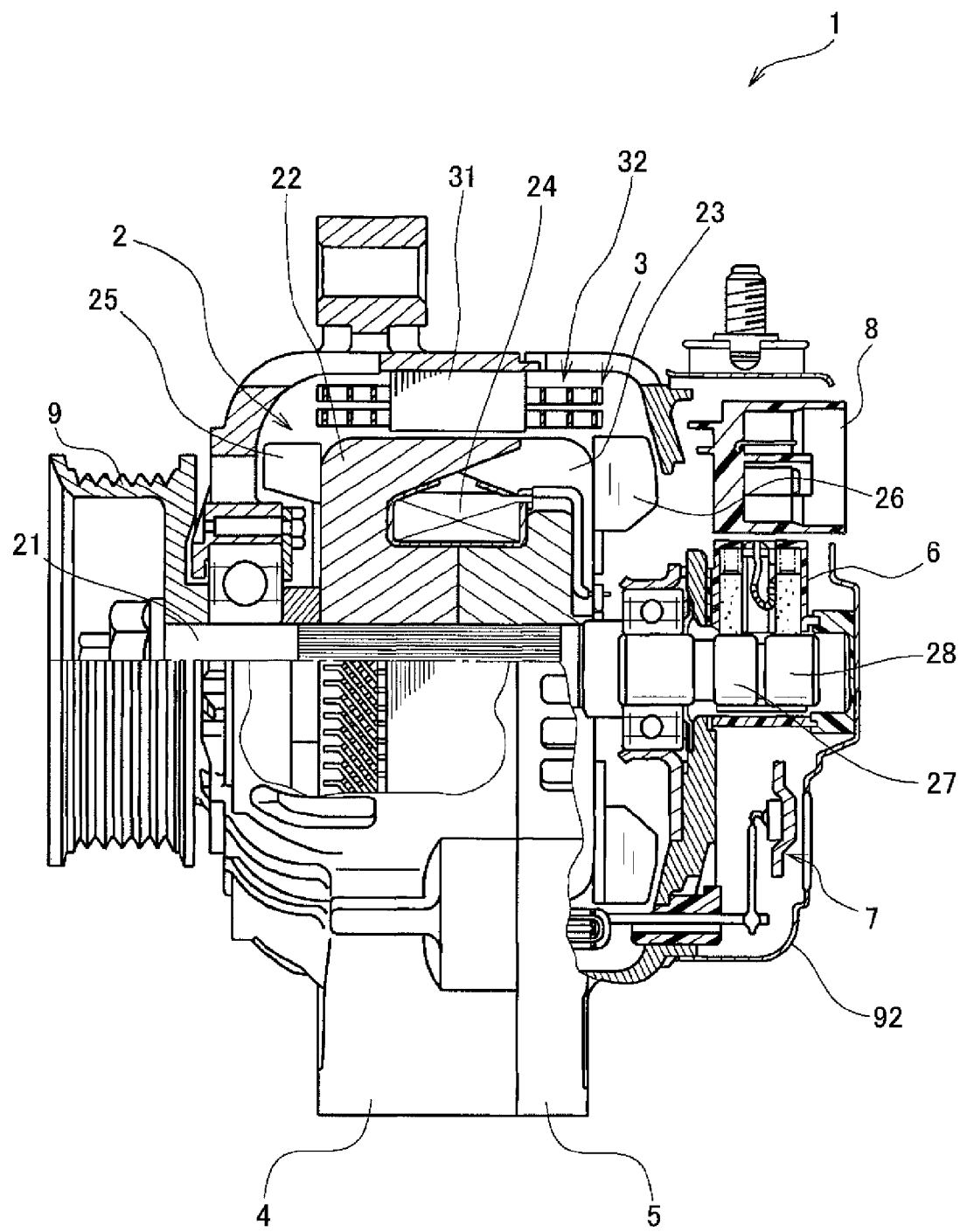
FIG. 1 is a schematic cross-sectional view of an automotive alternator which includes a rotor according to the exemplary embodiment.

FIG. 1 shows the overall configuration of an automotive alternator 1 which includes a rotor 2 according to an exemplary embodiment. The alternator 1 is designed to be used in a motor vehicle, such as a passenger car or a truck.

As shown in FIG. 1, the alternator 1 includes, in addition to the rotor 2, a stator 3, a front housing 4, a rear housing 5, a brush device 6, a rectifier 7, a voltage regulator 8, a pulley 9 and a rear cover 92.

The rotor 2 includes a rotating shaft 21, a pair of front and rear magnetic pole cores 22 and 23, a field coil 24 and a pair of front and rear cooling fans 25 and 26. The configuration of the rotor 2 will be described in detail later.

The stator 3 includes an annular stator core 31 and a three-phase stator coil 32. The stator core 31 is disposed radially outside the rotor 2 so as to face the radially outer periphery of the is rotor 2. The stator core 31 has a plurality of slots (not shown) formed therein; the slots are circumferentially spaced from one another at predetermined intervals. The stator coil 32 is mounted on the stator core 31 so as to be partially received in the slots of the stator core 31.

The front housing 4 and the rear housing 5 together accommodate both the rotor 2 and the stator 3 therein. Further, the rotating shaft 21 of the rotor 2 is rotatably supported by the front and rear housings 4 and 5 via bearings. The stator 3 is fixed to the front and rear housings 4 and 5 so as to surround the rotor 2 with a predetermined radial gap formed between the rotor 2 and the stator 3.

The brush device 6 is provided to supply field current to the field coil 24 during rotation of the rotor 2. The brush device 6 includes a pair of brushes that are respectively spring-loaded on a pair of slip rings 27 and 28 provided on a rear end portion (i.e., a right end portion in FIG. 1) of the rotating shaft 21.

The rectifier 7 is configured to rectify three-phase AC power outputted from the three-phase stator coil 32 of the stator 3 into DC power. In addition, part of the DC power is used as the field current to energize the field coil 24 of the rotor 2.

The voltage regulator 8 is configured to regulate the output voltage of the alternator 1 by controlling the field current supplied to the field coil 24.

The pulley 9 is mounted on a front end portion (i.e., a left end portion in FIG. 1) of the rotating shaft 21, so that torque generated by an engine (not shown) of the vehicle can be transmitted to the rotor 2 via the pulley 9, thereby driving the rotor 2.

The rear cover 92 covers all of the brush device 6, the rectifier 7 and the voltage regulator 8 from the rear side, thereby protecting them from foreign matter.

The above-described alternator 1 operates as follows. When torque generated by the engine is transmitted to the pulley 9 via a belt (not shown), the rotor 2 is driven by the torque to rotate in a predetermined direction. Meanwhile, the field current is supplied to the field coil 24 via sliding contact between the brushes of the brush device 6 and the slip rings 27 and 28, thereby magnetizing the front and rear magnetic pole cores 22 and 23 of the rotor 3 to create a rotating magnetic field. The rotating magnetic field induces the three-phase AC power in the three-phase stator coil 32, which is further rectified by the rectifier 7 into the DC power. The DC power is then outputted from the alternator 1, with the voltage thereof regulated by the voltage regulator 8.

Next, the configuration of the rotor 2 according to the present embodiment will be described in detail with reference to FIGS. 2 and 3.

Figure 2:
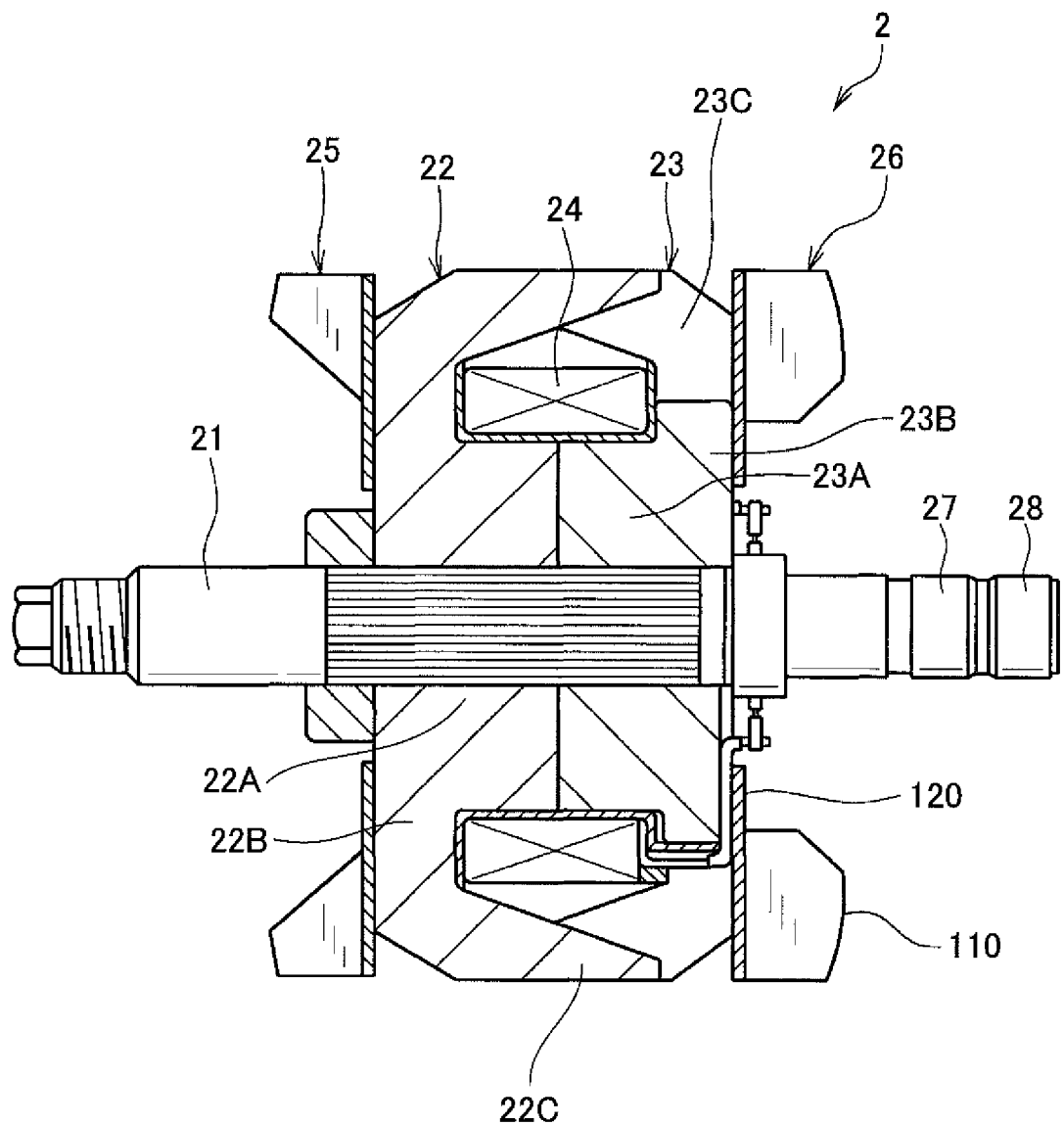
FIG. 2 is a schematic cross-sectional view of the rotor.

As shown in FIG. 2, in the present embodiment, the rotor 2 includes the rotating shaft 21, the pair of front and rear magnetic pole cores 22 and 23 fixed on the rotating shaft 21, the field coil 24 mounted on the front and rear magnetic pole cores 22 and 23, and the pair of front and rear cooling fans 25 and 26 respectively fixed to axial end faces of the front and rear magnetic pole cores 22 and 23.

Specifically, in the present embodiment, the front and rear magnetic pole cores 22 and 23 are implemented by a pair of Lundell-type magnetic pole cores.

The front magnetic pole core 22 has a hollow cylindrical boss portion 22A, a disc portion 22B and a plurality of magnetic pole claws 22C. The boss portion 22A is serration-fitted on the rotating shaft 21 so as to rotate along with the rotating shaft 21. The disc portion 22B is integrally formed with the boss portion 22A to extend radially outward from a front part (i.e., a left part in FIG. 2) of the boss portion 22A. Each of the magnetic pole claws 22C is integrally formed with the disc portion 22B to extend backward (i.e., rightward in FIG. 2) from a radially outer part of the disc portion 22B. The magnetic pole claws 22C are arranged at a predetermined pitch in the circumferential direction of the rotating shaft 21.

Similarly, the rear magnetic pole core 23 has a hollow cylindrical boss portion 23A, a disc portion 23B and a plurality of magnetic pole claws 23C. The boss portion 23A is serration-fitted on the rotating shaft 21 so as to rotate along with the rotating shaft 21. The disc portion 23B is integrally formed with the boss portion 23A to extend radially outward from a rear part (i.e., a right part in FIG. 2) of the boss portion 23A. Each of the magnetic pole claws 23C is integrally formed with the disc portion 23B to is extend forward (i.e., leftward in FIG. 2) from a radially outer part of the disc portion 23B. The magnetic pole claws 23C are arranged at the predetermined pitch in the circumferential direction of the rotating shaft 21.

The front and rear magnetic pole cores 22 and 23 are assembled together with the magnetic pole claws 22C of the front magnetic pole core 22 interleaved with the magnetic pole claws 23C of the rear magnetic pole core 23. Consequently, in the circumferential direction of the rotating shaft 21, the magnetic pole claws 22C of the front magnetic pole core 22 are positioned alternately with the magnetic pole claws 23C of the rear magnetic pole core 23.

In addition, it should be noted that the boss portions 22A and 23A of the front and rear magnetic pole cores 22 and 23 may also be integrally formed to make up a common boss portion of the magnetic pole cores 22 and 23.

The field coil 24 is mounted on both the boss portions 22A and 23A of the front and rear magnetic pole cores 22 and 23, so that it is surrounded by the boss portions 22A and 23A, disc portions 22B and 23B, and magnetic pole claws 22C and 23C of the magnetic pole cores 22 and 23.

Moreover, the field coil 24 has its ends respectively electrically connected to the slip rings 27 and 28, so that the field current can be supplied to the field coil 24 via sliding contact between the brushes of the brush device 6 and the slip rings 27 and 28 during rotation of the rotor 2. Consequently, upon the supply of the field current to the field coil 24, both the front and rear magnetic pole cores 22 and 23 are magnetized so that each of the magnetic pole claws 22C of the front magnetic pole core 22 forms a north pole, while each of the magnetic pole claws 23C of the rear magnetic pole core 23 forms a south pole.

The front and rear cooling fans 25 and 26 are provided to create flow of cooling air for cooling heat-generating parts of the rotor 2, such as the rectifier 7 and the stator coil 32. The front cooling fan 25 is fixed to the front end face (i.e., the axial end face on the front side) of the front magnetic pole core 22, while the rear cooling fan 26 is fixed to the rear end face (i.e., the axial end face on the rear side) of the rear magnetic pole core 23.

In the present embodiment, the manner of fixing the front cooling fan 25 to the front end face of the front magnetic pole core 22 is similar to that of fixing the rear cooling fan 26 to the rear end face of the rear magnetic pole core 23. Therefore, for the sake of avoiding redundancy, only the manner of fixing the rear cooling fan 26 to the rear end face of the rear magnetic pole core 23 will be described hereinafter.

Figure 3:
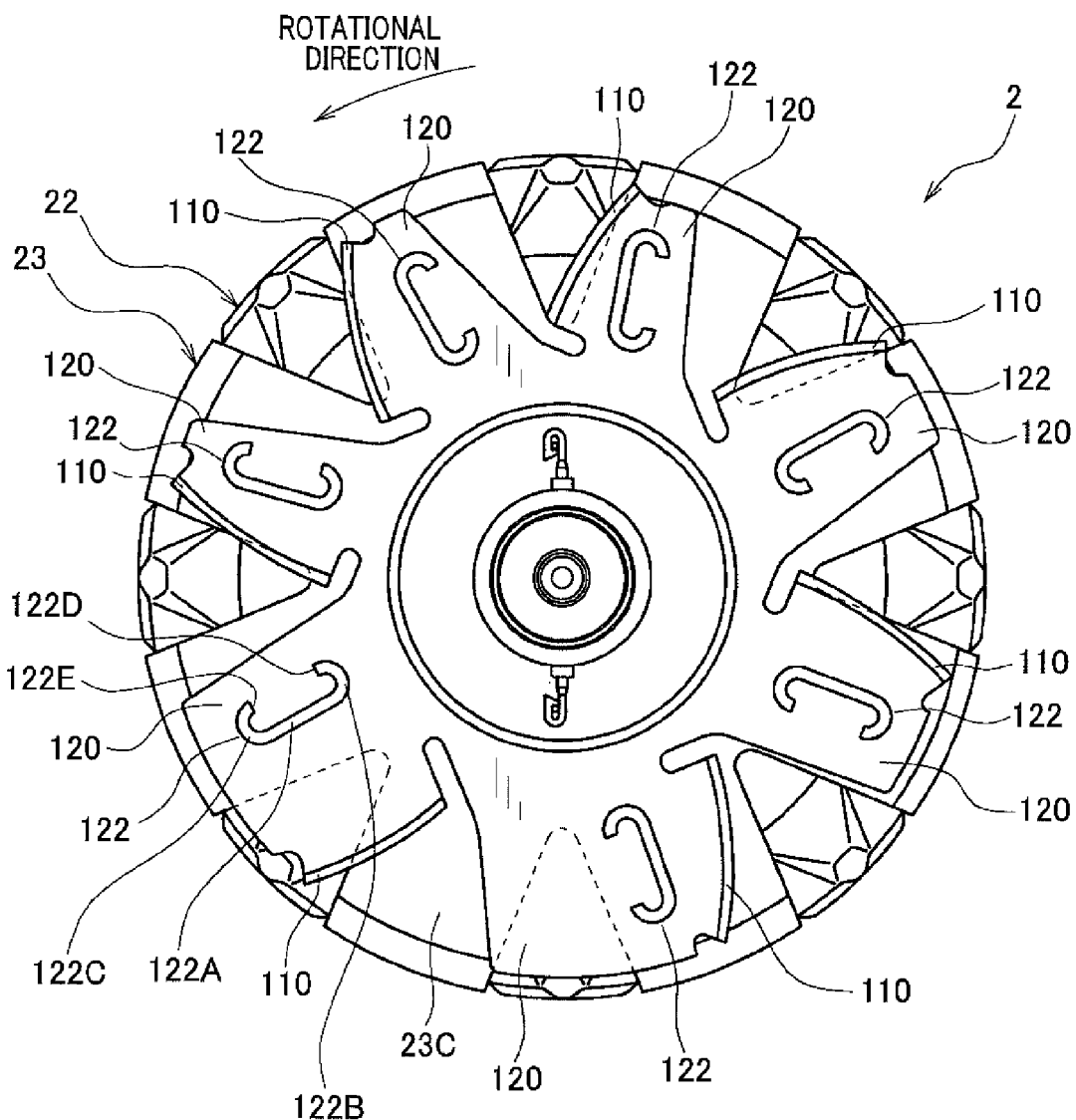
FIG. 3 is a rear end view of the rotor illustrating the configuration of a rear cooling fan of the rotor.

As shown in FIG. 3, the cooling fan 26 includes a plurality (e.g., 7 in the present embodiment) of fan blades (or blade portions) 110 and a base plate (or base portion) 120. Each of the fan blades 110 is gradually bent against the rotational direction of the rotor 2 while extending radially outward from its radially inner end. The fan blades 110 are arranged in the circumferential direction of the rotating shaft 21 at unequal angular pitches. The base plate 120 retains the fan blades 110 such that the fan blades 110 axially stand from the base plate 120. The base plate 120 is fixed to the rear end face of the magnetic pole core 23 by laser welding.

In addition, in the present embodiment, the cooling fan 26 is configured as a centrifugal fan so that the fan blades 110 are perpendicular to the base plate 120. However, the cooling fan 26 may also be configured as a mixed-flow fan so that the fan blades 110 would be oblique to the base plate 120.

In the present embodiment, the cooling fan 26 is made of a steel plate which is plated with, for example, zinc. More specifically, the cooling fan 26 is obtained by shaping the steel plate by pressing; the outer surface of the steel plate is covered with zinc.

The base plate 120 of the cooling fan 26 is welded at seven spots to the rear end face of the magnetic pole core 23, forming seven welds 122 therebetween. More specifically, each of the welds 122 is formed by those portions of the base plate 120 and the magnetic pole core 23 which are molten and mixed together at one of the seven welding spots during the laser welding and solidified after the laser welding.

Moreover, each of the welds 122 has the shape of an open loop elongated in a given direction. That is, each of the welds 122 is shaped to have a pair of open ends (or free ends).

More specifically, as shown in FIG. 3, in the present embodiment, each of the welds 122 is substantially elongated C-shaped to include a straight part 122A and a pair of curved parts 122B and 122C respectively extending from opposite ends of the straight part 122A. The straight part 122A extends straight substantially along a radial direction of the rotating shaft 21. Here, the term "substantially along a radial direction" includes both exactly along the radial direction and deviated from the radial direction by a limited angle. The curved part 122B has an open end 122D on the opposite side to the straight part 122A; the open end 122D makes up one of the open ends of the weld 122. The open end 122D has no other part (e.g., the straight part 122A) of the weld 122 adjoining it. That is, the area between the open end 122D and any other part of the weld 122 falls outside of the weld 122. Similarly, the curved part 122C has an open end 122E on the opposite side to the straight part 122A; the open end 122E makes up the other open end of the weld 122. The open end 122E has no other part (e.g., the straight part 122A) of the weld 122 adjoining it. That is, the area between the open end 122E and any other part of the weld 122 falls outside of the weld 122.

According to the present embodiment, it is possible to achieve the following advantageous effects.

In the present embodiment, the cooling fan 26 has the base plate 120 laser-welded to the axial end face (i.e., the rear end face) of the magnetic pole core 23 and the fan blades 110 extending from the base plate 120. That is, the cooling fan 26 is fixed to the magnetic pole core 23 by laser welding.

Therefore, when the welding positions (or the positions of the welding spots) are changed with a dimensional change in the alternator 1, it is unnecessary to replace welding jigs according to the change in the welding positions. As a result, it is possible to simplify the manufacturing process and reduce the manufacturing cost.

Moreover, in the present embodiment, each of the welds 122 formed between the base plate 120 of the cooling fan 26 and the magnetic pole core 23 has the pair of open ends 122D and 122E. That is, each of the welds 122 does not have the shape of a closed loop.

Consequently, though the cooling fan 26 is made of the zinc-plated steel plate and thus zinc gas is produced by the melting of zinc during the laser welding, the zinc gas can be easily exhausted via the gap between the base plate 120 and the rear end face of the magnetic pole core 23, thereby making it difficult for voids to be formed in the molten portions of the base plate 120 and the magnetic pole core 23. As a result, the welding strength and thus the reliability of the rotor 2 can be improved.

Moreover, in the present embodiment, each of the welds 122 formed between the base plate 120 of the cooling fan 26 and the magnetic pole core 23 includes the pair of curved parts 122B to and 122C; the open ends of the curved parts 122B and 122C respectively represent the open ends 122D and 122E of the weld 122. Furthermore, for each of the open ends 122D and 122E, the area between the open end and any other part of the weld 122 falls outside of the weld 122.

With the above configuration, the zinc gas (or vapor) produced during the laser welding can be easily exhausted through the area falling outside of the weld 122.

In addition, to more reliably perform the laser welding process, it is preferable to pre-burn the zinc at the welding positions before the laser welding process. In this case, the pre-burning process can be performed by utilizing the laser welding apparatus, thereby suppressing increase in the manufacturing cost.

In the present embodiment, each of the welds 122 formed between the base plate 120 of the cooling fan 26 and the magnetic pole core 23 includes the straight part 122A.

Consequently, with the straight part 122A, it is possible to distribute tensile stress induced in the weld 122 during the laser welding over a wide range, thereby further improving the reliability.

Further, in the present embodiment, for each of the welds 122 formed between the base plate 120 of the cooling fan 26 and the magnetic pole core 23, the straight part 122A of the weld 122 extends straight substantially along the radial direction of the rotating shaft 21.

Consequently, the longitudinal direction of the straight part 122A is made substantially coincident with the direction in which the tensile stress induced in the weld 122 during the laser welding is concentrated. As a result, it is possible to further improve the reliability.

In addition, in performing laser welding, it is generally difficult to secure high welding quality at the welding start and welding finish positions. However, in the present embodiment, the open ends 122D and 122E of the curved parts 122B and 122C of the weld 122, which respectively represent the welding start and welding finish positions, are arranged at those areas where only low tensile stress or compressive stress is induced.

Consequently, it is possible to secure high reliability of the rotor 2.

While the above particular embodiment has been shown and described, it will be understood by those skilled in the art that various modifications, changes, and improvements may be made without departing from the spirit of the present invention.

For example, in the previous embodiment, for each of the welds 122 formed between the base plate 120 of the cooling fan 26 and the magnetic pole core 23 is substantially elongated C-shaped to include the straight part 122A and the pair of curved parts 122B and 122C.

However, each of the welds 122 may be modified to have other shapes as will be described in the following first to fourth modifications.

First Modification

Figure 4:
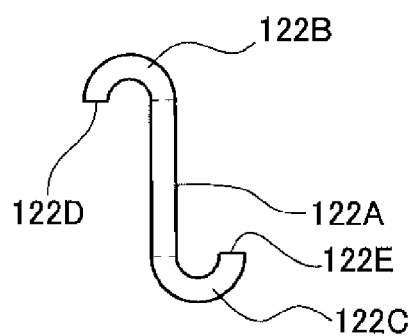
FIG. 4 is a schematic view illustrating the shape of a weld formed in the rotor according to a first modification.

As shown in FIG. 4, in the first modification, each of the welds 122 is substantially inverted S-shaped to include a straight part 122A and a pair of curved parts 122B and 122C. The curved parts 122B and 122C respectively extend from opposite longitudinal ends of the straight parts 122A so as to be respectively located on opposite lateral sides of the straight part 122A. Moreover, each of the curved parts 122B and 122C has an open end on the opposite side to the straight part 122A, which makes up one of the open ends 122D and 122E of the weld 122.

Second Modification

Figure 5:
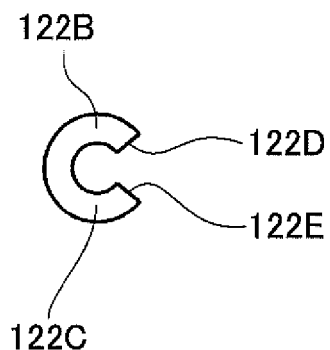
FIG. 5 is a schematic view illustrating the shape of a weld formed in the rotor according to a second modification.

As shown in FIG. 5, in the second modification, each of the welds 122 is substantially shortened C-shaped to include only a pair of curved parts 122B and 122C. That is, each of the welds 122 has no straight part 122A provided between the curved parts 122B and 122C. Moreover, the curved parts 122B and 122C are connected to each other at one ends thereof; the other ends of the curved parts 122B and 122C respectively make up the open ends 122D and 122E of the weld 122.

Third Modification

Figure 6:
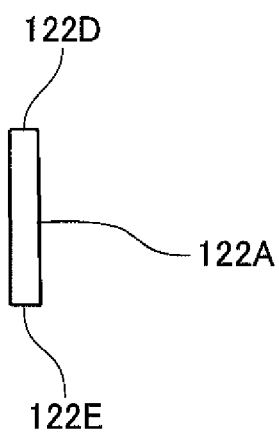
FIG. 6 is a schematic view illustrating the shape of a weld formed in the rotor according to a third modification.

As shown in FIG. 6, in the third modification, each of the welds 122 extends straight over its entire length. That is, each of the welds 122 includes no curved part. Moreover, for each of the welds 122, opposite longitudinal ends of the weld 122 respectively make up the open ends 122D and 122E of the weld 122.

Fourth Modification

Figure 7:
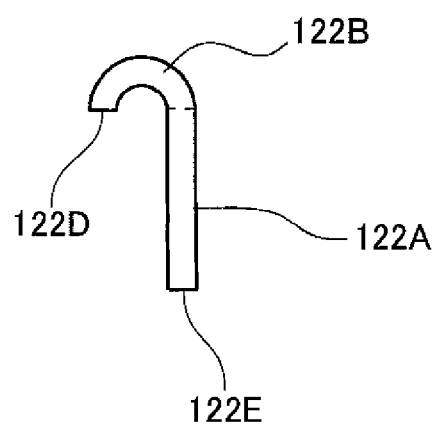
FIG. 7 is a schematic view illustrating the shape of a weld formed in the rotor according to a fourth modification.

As shown in FIG. 7, in the fourth modification, each of the welds 122 is substantially hook-shaped to include a straight part 122A and a curved part 122B. The straight and curved parts 122A and 122B are connected to each other at one ends thereof; the other ends of the straight and curved parts 122A and 122B respectively make up the open ends 122E and 122D of the weld 122.

Furthermore, to more effectively exhaust the zinc gas produced during the laser welding of the cooling fan 26 to the magnetic pole core 23, it is preferable to provide an additional exhaust passage of the zinc gas as will be described in the following fifth and sixth modifications.

Fifth Modification

Figure 8:
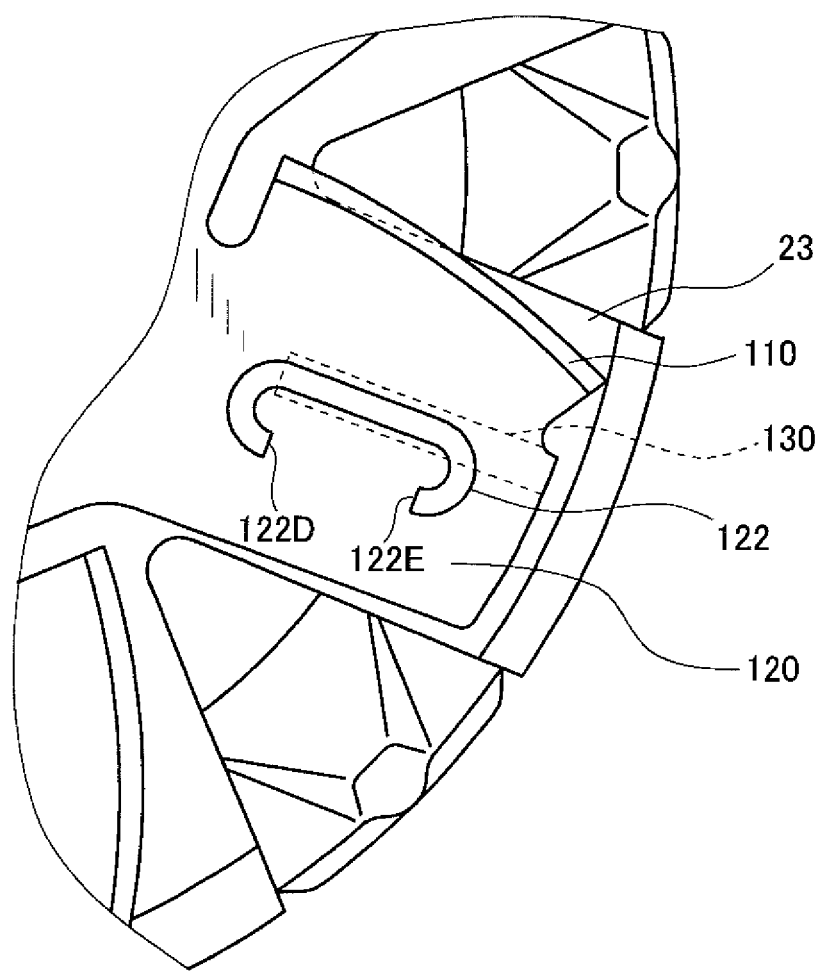
FIG. 8 is a schematic view illustrating a recess provided in the vicinity of a weld formed in the rotor according to a fifth modification.

As shown in FIG. 8, in the fifth modification, for each of the welds 122, there is formed a recess 130 in at least one of opposing axial end faces of the base plate 120 of the cooling fan 26 and the magnetic pole core 23. The recess 130 extends substantially radially to have its radially outer end coinciding with the radially outer end of the base plate 120. The recess 130 is provided in close vicinity to the weld 122. More specifically, in the present modification, the recess 130 is formed so as to partially overlap the weld 122 in the axial direction of the rotating shaft 21.

Moreover, for each of the welds 122, the laser welding is started at the radially inner open end 122D of the weld 122 and finished at the radially outer open end 122E of the weld 122. Consequently, the zinc gas produced during the laser welding can be effectively exhausted via the recess 130 to the outside of the rotor 2.

Sixth Modification

Figure 9:
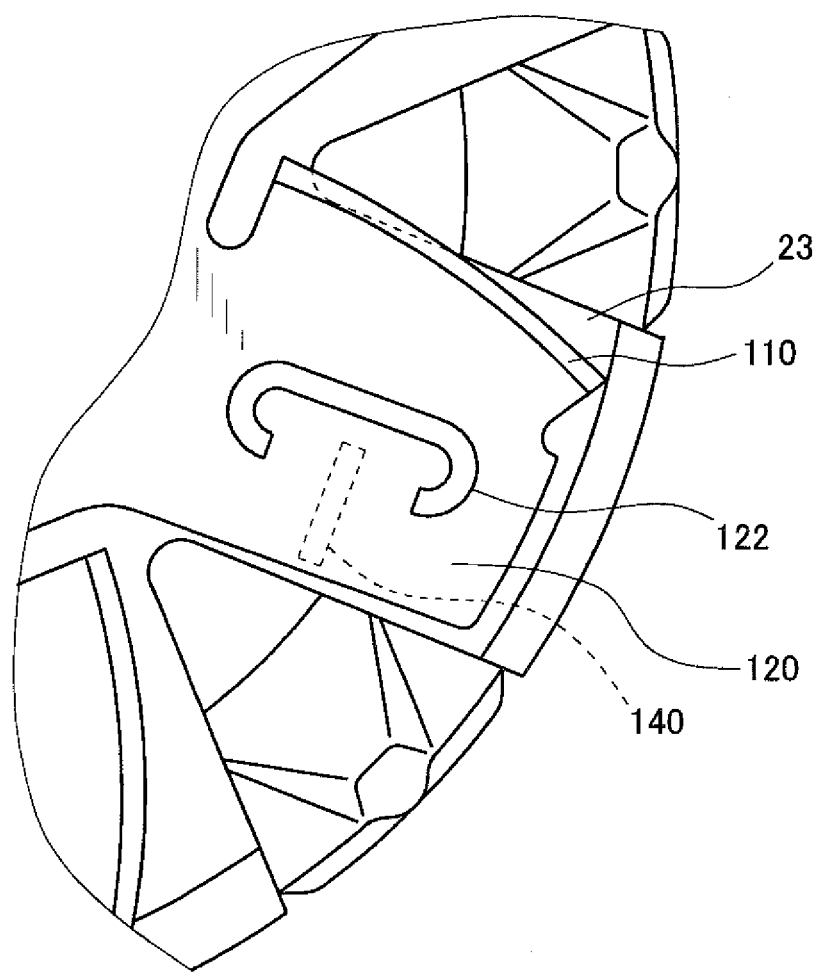
FIG. 9 is a schematic view illustrating a protrusion provided in the vicinity of a weld formed in the rotor according to a sixth modification.

As shown in FIG. 9, in the sixth modification, for each of the welds 122, there is formed a protrusion 140 on at least one of opposing axial end faces of the base plate 120 of the cooling fan 26 and the magnetic pole core 23. The protrusion 140 is positioned in close vicinity to the weld 122 such that at least part of the protrusion 140 does not overlap the weld 122 in the axial direction of the rotating shaft 21.

Consequently, around the protrusion 130, there is formed an axial gap between the opposing axial end faces of the base plate 120 of the cooling fan 26 and the magnetic pole core 23. As a result, via the axial gap, the zinc gas produced during the laser welding can be effectively exhausted to the outside of the rotor 2.

In addition, as described previously, each of the welds 122 is provided with the recess 130 in the fifth modification and with the protrusion 140 in the sixth modification. However, it is also possible that some of the welds 122 are each provided with a recess 130 as in the fifth modification and the remaining welds 122 are each provided with a protrusion 140 as in the fourth modification.

Furthermore, in the previous embodiment, the present invention is applied to the rotor 2 for the automotive alternator 1. However, the present invention can also be applied to rotors for other rotating electric machines (e.g., electric motors and motor-generators) where a cooling fan is laser-welded to a magnetic pole core.

What is claimed is:

1. A rotor for a rotating electric machine, the rotor comprising:
    a magnetic pole core; and
    a cooling fan including a base plate, which is laser-welded to an axial end face of the magnetic pole core, and a plurality of fan blades extending from the base plate, wherein
    at least one weld is formed between the base plate of the cooling fan and the magnetic pole core to have a pair of open ends,
    the weld is substantially C-shaped to include a straight part and a pair of curved parts respectively extending from opposite ends of the straight part,
    the rotor further comprises a rotating shaft on which the magnetic pole core is fixed,
    the straight part of the weld extends straight substantially along a radial direction of the rotating shaft, and
    the curved parts and the open ends of the weld are located on an opposite side of the straight part to an adjacent one of the fan blades in a circumferential direction of the rotating shaft, the adjacent fan blade being closest to the weld among all the fan blades.

2. The rotor as set forth in claim 1, wherein on at least one of the axial end face of the magnetic pole core and an axial end face of the base plate of the cooling fan which faces the axial end face of the magnetic pole core, there is formed a protrusion so as to have an axial gap formed around the protrusion and between the axial end faces of the base plate of the cooling fan and the magnetic pole core.

3. The rotor as set forth in claim 2, wherein the protrusion is positioned so that at least part of the protrusion does not overlap the weld in an axial direction of the rotating shaft.

4. The rotor as set forth in claim 1, wherein in at least one of the axial end face of the magnetic pole core and an axial end face of the base plate of the cooling fan which faces the axial end face of the magnetic pole core, there is formed a recess so as to partially overlap the weld in an axial direction of the rotating shaft.

5. The rotor as set forth in claim 4, wherein the recess extends to have an end thereof coinciding with a radially outer end of the base plate of the cooling fan.

6. The rotor as set forth in claim 1, wherein a plurality of welds are formed between the base plate of the cooling fan and the magnetic pole core to each have a pair of open ends,
    the number of the welds is equal to the number of the fan blades,
    each of the welds is substantially C-shaped to include a straight part and a pair of curved parts respectively extending from opposite ends of the straight part,
    for each of the welds, the straight part of the weld extends straight substantially along a radial direction of the rotating shaft and the curved parts and the open ends of the weld are located on an opposite side of the straight part to an adjacent one of the fan blades in the circumferential direction of the rotting shaft, the adjacent fan blade being closest to the weld among all of the fan blades.

* * * * *